(12) United States Patent
Smith

(10) Patent No.: US 11,089,723 B2
(45) Date of Patent: Aug. 17, 2021

(54) CLOSING WHEEL ASSEMBLIES

(71) Applicant: Mark Smith, Tilbury (CA)

(72) Inventor: Mark Smith, Tilbury (CA)

( * ) Notice: Subject to any disclaimer, the term of this patent is extended or adjusted under 35 U.S.C. 154(b) by 207 days.

(21) Appl. No.: 16/267,820

(22) Filed: Feb. 5, 2019

(65) Prior Publication Data

US 2019/0239418 A1     Aug. 8, 2019

Related U.S. Application Data

(60) Provisional application No. 62/626,317, filed on Feb. 5, 2018.

(51) Int. Cl.
    *A01C 5/06*     (2006.01)
(52) U.S. Cl.
    CPC .................... *A01C 5/068* (2013.01)
(58) Field of Classification Search
    CPC ........... A01C 5/068; A01C 5/066; A01C 5/06; A01C 5/00
    See application file for complete search history.

(56) References Cited

U.S. PATENT DOCUMENTS

| | | |
|---|---|---|
| 836,773 A | 11/1906 | Moore |
| 4,404,918 A | 9/1983 | Whalen |
| 4,771,713 A | 9/1988 | Kinenbaw |
| 4,858,698 A | 8/1989 | Williamson |
| 5,477,792 A | 12/1995 | Bassett |
| 5,660,126 A | 8/1997 | Freed |
| 5,970,891 A | 10/1999 | Schlegel |
| 6,701,856 B1 | 3/2004 | Zoske |
| 7,614,827 B1 * | 11/2009 | Makk ............... A01G 25/06 405/182 |
| 9,107,337 B2 | 8/2015 | Bassett |
| 9,215,838 B2 | 12/2015 | Bassett |
| 9,320,191 B2 | 4/2016 | Patwardhan |
| 2016/0234995 A1 | 8/2016 | Gent |

FOREIGN PATENT DOCUMENTS

| | | |
|---|---|---|
| CN | 201585248 U | 9/2010 |
| EP | 2754342 A1 | 7/2014 |

OTHER PUBLICATIONS

Yetter Farm Equipment, 2968 Row-Unit Mount In-Between Dual Wheel Fertilizer Opener—Yetter Co—, Jan. 30, 2018, www.yetterco.com.

* cited by examiner

*Primary Examiner* — Christopher J. Novosad
(74) *Attorney, Agent, or Firm* — The Dobrusin Law Firm, PC

(57) ABSTRACT

A closing wheel assembly used in planting or other agricultural endeavors. The closing wheel assembly is configured to allow each individual wheel to both vary in angle having an increased pitch so as to more effectively pinch the soil (or other ground cover) so as to fully cover the newly planted seed. The closing wheel assembly is used in connection with a planter so as to more effectively close the trench formed by the planter and fully cover the newly planted seed. The closing wheel generally includes an arm extending behind the planter and over a first closing wheel. The present invention comprises a second closing wheel provided behind the first closing wheel where the second closing wheel may be positioned at a different angle and provided at an approximate 5° pitch to effectively pinch the soil back in place after planting.

9 Claims, 6 Drawing Sheets

CLOSING WHEEL ASSEMBLIES

CROSS REFERENCE TO RELATED APPLICATIONS

The application claims priority and benefit to U.S. provisional application Ser. No. 62/626,317 filed on Feb. 5, 2018 which is incorporated herein by reference.

TECHNICAL FIELD

The present specification generally relates to agricultural equipment and, more specifically, an apparatus for closing ground after planting.

BACKGROUND

It is well known in the art of agriculture to use a single (or a pair of side by side) planter closing wheels downstream of a planted seed. The closing wheels as already known are either metal, rubber or some variation thereof and are configured to move the soil or other ground cover over the newly planted seed. However, traditional and known closing wheels do not sufficiently close (or cover) the ground after a seed has been planted, especially on ground that may already contain some growth.

Closing wheels are commonly connected to a planter. A planter is a farm implement, usually towed behind a tractor, that sows or plants seeds in rows throughout a field. It is commonly connected to the tractor. Planters lay the seeds down in precise manner along rows. Commonly known closing wheels are positioned in the singular and just downstream of the hopper thereby allowing the closing wheel to {try to} cover the newly sowed seed with soil (or other ground cover).

Accordingly, a need exists for alternative closing wheel system for improved ground coverage after automated planting.

SUMMARY

A closing wheel is provided in accordance with the forgoing description and attached drawings. The closing wheel assembly used in planting or other agricultural endeavors. The closing wheel assembly is configured to allow each individual wheel to both vary in angle having an increased pitch so as to more effectively pinch the soil (or other ground cover) so as to fully cover the newly planted seed. The closing wheel assembly is used in connection with a planter so as to more effectively close the trench (or other indentation or depression) formed by the planter and fully cover the newly planted seed.

The closing wheel generally includes an arm extending behind the planter and over a first closing wheel. The present invention comprises a second closing wheel provided behind the first closing wheel where the second closing wheel is positioned at a different angle and provided at an approximate 5° (or similar) pitch to effectively pinch the soil back in place after planting.

In one embodiment, a closing wheel assembly for use in connection with a planter, the closing wheel having a frame connected to the planter, at least one set of closing wheels, the set of closing wheels having a first wheel and an opposed second wheel and an adjustment mechanism configured to adjust both lateral positioning and pitch of the first wheel and the second wheel, the adjustment mechanism having a first adjustment portion configured to adjust lateral positioning, the adjustment mechanism having a second adjustment portion configured to adjust pitch of the first wheel and the second wheel wherein lateral positioning and pitch are adjusted to facilitate improved covering of a seed during the planting process. In some embodiments, the first adjustment portion of the adjustment mechanism is adjusted by a horizontally positioned threaded bolt. The threaded bolt may be configured to pivot two cross support members, each of the cross support members having a central pivot point. In other embodiments, each of the cross members is connected to one of the first wheel or the second wheel so as to push or pull the first wheel and the second wheel to facilitate lateral movement. In some embodiments, the second adjustment portion of the adjustment mechanism is adjusted by a vertically positioned threaded bolt. Further, in some embodiments, the second adjustment portion of the adjustment mechanism is adjusted by a plurality of links, the plurality of links configured to facilitate rotational movement so as to adjust the pitch of the first wheel and the second wheel. Additionally, in other embodiments, two sets of closing wheels are provided. In these embodiments, two adjustment mechanisms are provided, a first adjustment mechanism for the first set of wheels and a second adjustment mechanism for the second set of wheels. Further, in some embodiments, the adjustment mechanisms are configured to adjust the pitch of the wheels between 5°-30° so as to facilitate improved ground covering during the planting process.

In some embodiments, a closing wheel assembly for use in connection with a planter is provided having a frame connected to the planter, a first set of closing wheels and a second set of closing wheels, the first set of closing wheels and the second set of closing wheels each connected to the frame, and a first adjustment mechanism configured to adjust both the lateral positioning and the pitch of the first set of closing wheels and a second adjustment mechanism configured to adjust both the lateral positioning and the pitch of the second set of closing wheels, each of the first adjustment mechanism and the second adjustment mechanism each having a first adjustment portion and a second adjustment portion. In some embodiments, the first adjustment portion of the adjustment mechanism is adjusted by a horizontally positioned threaded bolt. In some embodiments, the threaded bolt is configured to pivot two cross support members, each of the cross support members having a central pivot point. Further, in some embodiments, each of the cross members is connected to one of the first wheel or the second wheel so as to push or pull the first wheel and the second wheel to facilitate lateral movement. In some embodiments, the second adjustment portion of the adjustment mechanism is adjusted by a vertically positioned threaded bolt. In some embodiments, the second adjustment portion of the adjustment mechanism is adjusted by a plurality of links, the plurality of links configured to facilitate rotational movement so as to adjust the pitch of the first wheel and the second wheel.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The closing wheel assembly of the present specification is configured to allow each individual wheel to both vary in angle having an increased pitch so as to more effectively pinch the soil (or other ground cover) so as to fully cover the newly planted seed. The closing wheel assembly of the present specification is used in connection with a planter so as to more effectively close the trench formed by the planter and fully cover the newly planted seed. The closing wheel generally includes an arm extending behind the planter and over a first closing wheel. The present invention comprises a second closing wheel provided behind the first closing wheel where the second closing wheel is positioned at a different angle and provided at an approximate 5° (but up to 30°) pitch to effectively pinch the soil back in place after planting. The first wheels and the seconds wheel may be different pitches and/or different spaced apart distances from as compared to each other.

Figure 1:
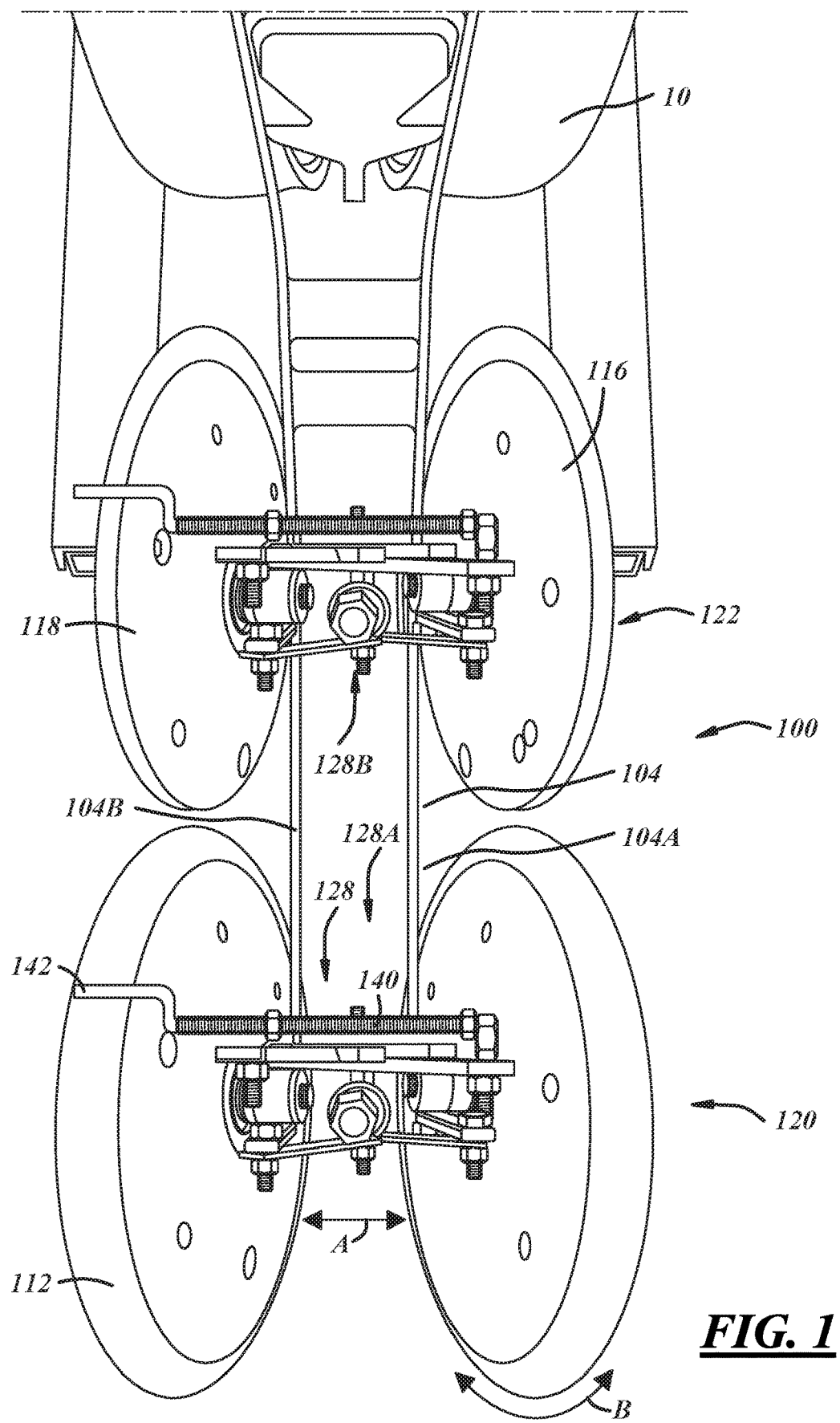
FIG. 1 depicts an elevational view of the closing wheel assembly according to one or more embodiments shown and described herein.
Figure 2:
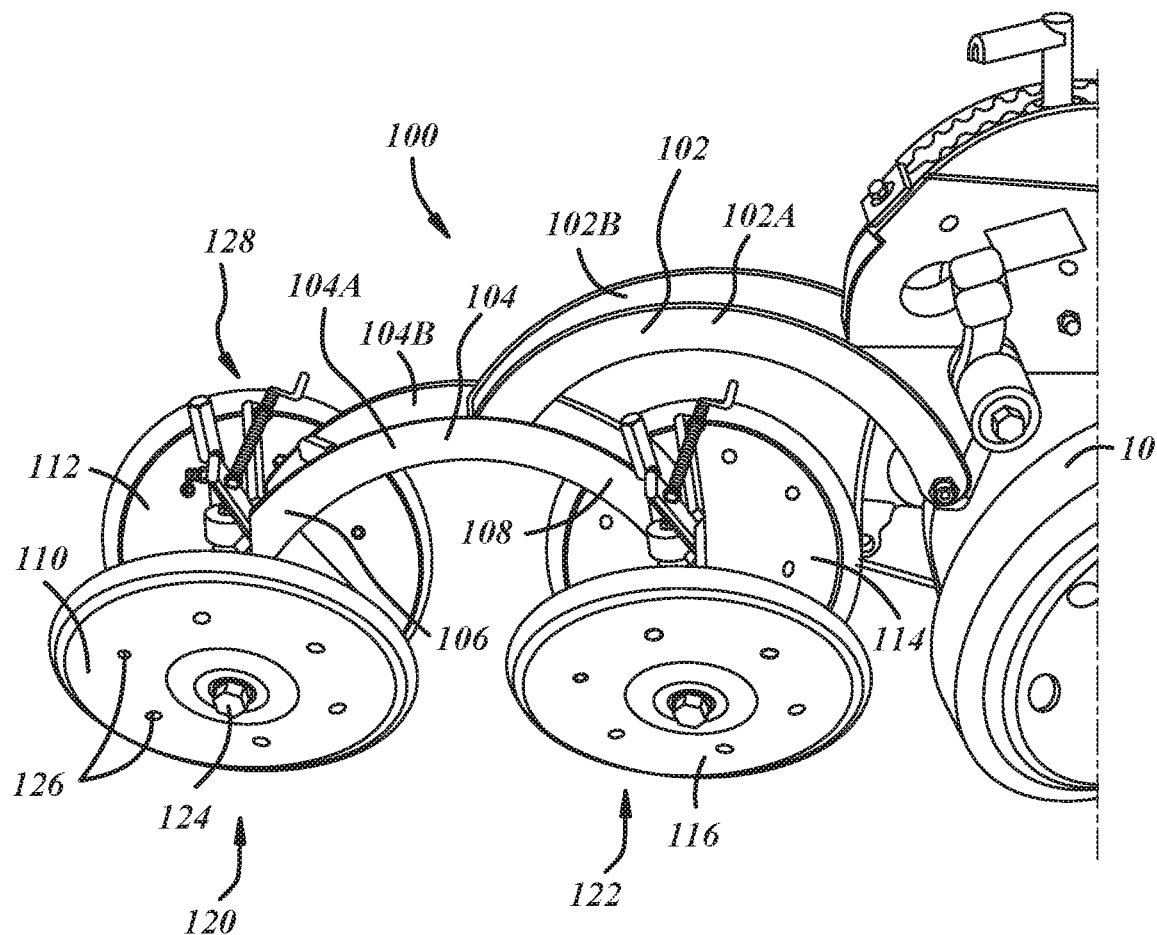
FIG. 2 depicts a perspective view of the closing wheel assembly according to one or more embodiments shown and described herein.

Referring now to FIG. 1, a planter 10 is provided having a frame and a hopper. The planter 10 is commonly connected to a tractor or other suitable vehicle. The frame is configured to hold the hopper and the closing wheel assembly as shown herein. The closing wheel assembly as shown herein is intended to be an auxiliary addition to the planter, but may alternatively be integrated into the original build.

FIGS. 1-7 depict a closing wheel assembly 100 which includes a frame having a first portion 102 and a second portion 104. The first portion 104 extends from the planter 10 to the closing wheel assembly 100. The frame portion 102 includes a first arm 102A and a second arm 102B. Each of the arms 102A and 102B curve up and down towards the closing wheel assembly 100. Each of the arms 102A, 102B are spaced apart from each other and are generally parallel to each other. In this embodiment, each of the arms 102A, 102B are generally flat and made from a sheet-like metal material.

The frame portion 104 includes the first portion 104A and the second portion 104B. The first and second portions 104A, 104B are arms extending from the first portion 102 to the individual wheel assemblies 120, 122. The arm portions 104A, 104B are made in a similar manner as compared to the arm portions 102A, 102B in that they are generally parallel to each other and composed of a sheet-like metal material. In this embodiment, the arm portions 104A, 104B are generally parallel to each other and arranged in an arc-like arrangement where the distal ends of the arm portions 104A, 104B extend down towards the wheel assemblies 120, 122.

In the present embodiment, each of the wheel assemblies 120, 122 are effectively identical. Each of the wheel assemblies 120, 122 include a pair of spaced apart closing wheels which are each independently adjustable with respect to distance spaced apart therefrom and pitch. The wheel assembly 120 includes a first wheel 110 and a second wheel 112. Adjustment mechanism assemblies 128 are included in both the wheel assembly 120 and the wheel assembly 122. In the wheel assembly 120, the adjustment mechanism 128 is adjustment mechanism 128A. In the wheel assembly 122, the adjustment assembly 128 is adjustment assembly 128B. The adjustment assemblies 128A and 128B are effectively identical and duplicate. The wheel assembly 120 includes a pair of spaced apart wheels 110, 112 wherein each of the wheels includes a central axis 124 and a plurality of fasteners 126 to secure each wheel together. The wheel assembly 120 is positioned on a distal end 106 of the arm 104.

The wheel assembly 120 includes a first wheel 114 and a second wheel 116. The same adjustment mechanism as discussed in the foregoing and in the aforementioned is effectively identical. The adjustment mechanism allows the wheels to move in a lateral direction A so as to move closer and further apart from each other and in an angular direction B so as to adjust the pitch of the closing wheel sets 120, 122.

The adjustment mechanism 128 generally includes a horizontal actuator 140 to adjust lateral movement and a vertical adjuster 180 so as to adjust pitch. It should be understood that when referring the adjustment mechanism 128, reference is simultaneously made to both the adjustment mechanism 128A and 128B. The actuator or adjuster 140 is an adjuster configured to move the cross braces 150 and 152. The cross braces 150, 152 are connected to the adjuster 140 at first distal ends and to the wheels 110, 112 at a second distal end. The cross brace 150 is connected to a connector 182 so as to provide a secure connection point. The cross brace 150 is connected at a first distal end to the adjuster 140 at a pivot point 154. The cross brace 150 is further connected to pivot point 178 at a second distal end. Similarly, the cross brace 152 is connected to adjuster 140 at a first distal end and pivot point 156 and at a second distal end and pivot point 176. As the user rotates the handle 142 so as to rotate the adjuster 140, the cross braces 150, 152 pivot with respect to each other at a main pivot point 190 in the center of each of the cross braces 150, 152. As the user continues to rotate the handle 142 thereby rotating the adjuster 140, the cross braces 150, 152, move together or apart so as to move the wheels 110, 112 in a lateral direction either closer together or further apart. This lateral movement is illustrated in FIG. 12. In this depiction, the wheels 110, 112 are illustrated in solid lines whereas adjusted wheels 110A, 112A are positioned closer together in a lateral direction after adjustment.

Figure 3:
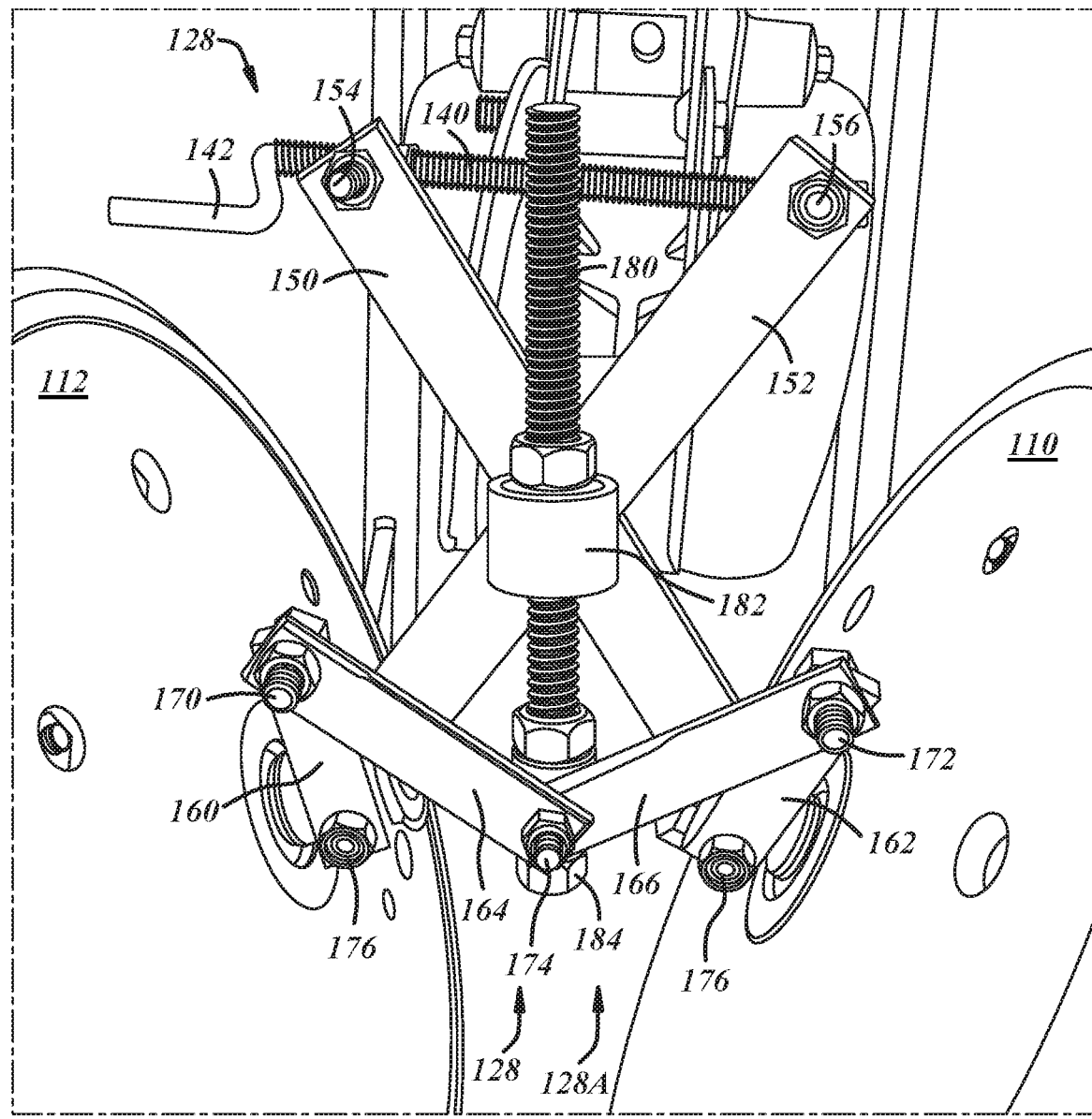
FIG. 3 depicts a close up view of the adjustment mechanism of the closing wheel according to one or more embodiments shown and described herein.
Figure 4:
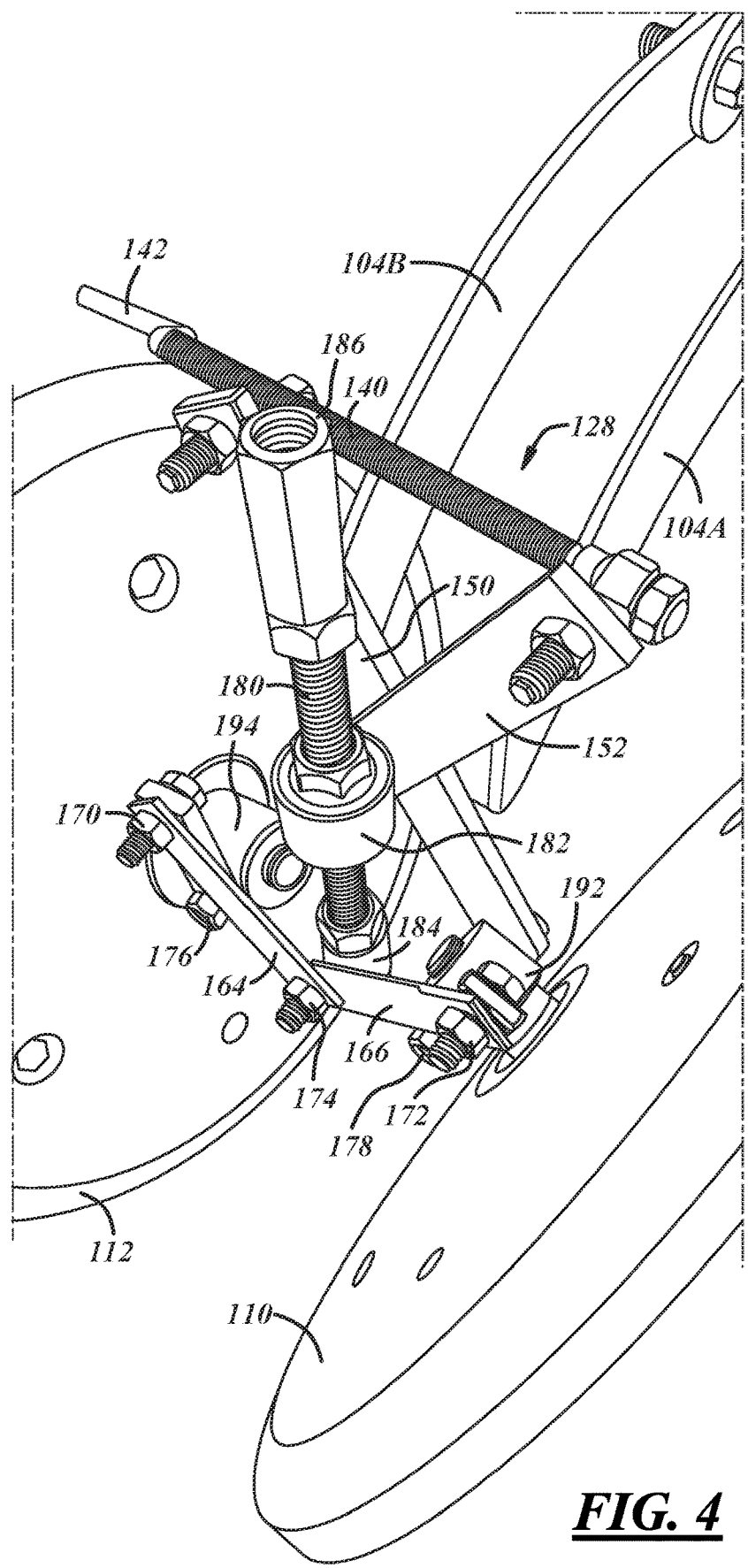
FIG. 4 depicts an alternative a close up view of the adjustment mechanism of the closing wheel according to one or more embodiments shown and described herein.
Figure 5:
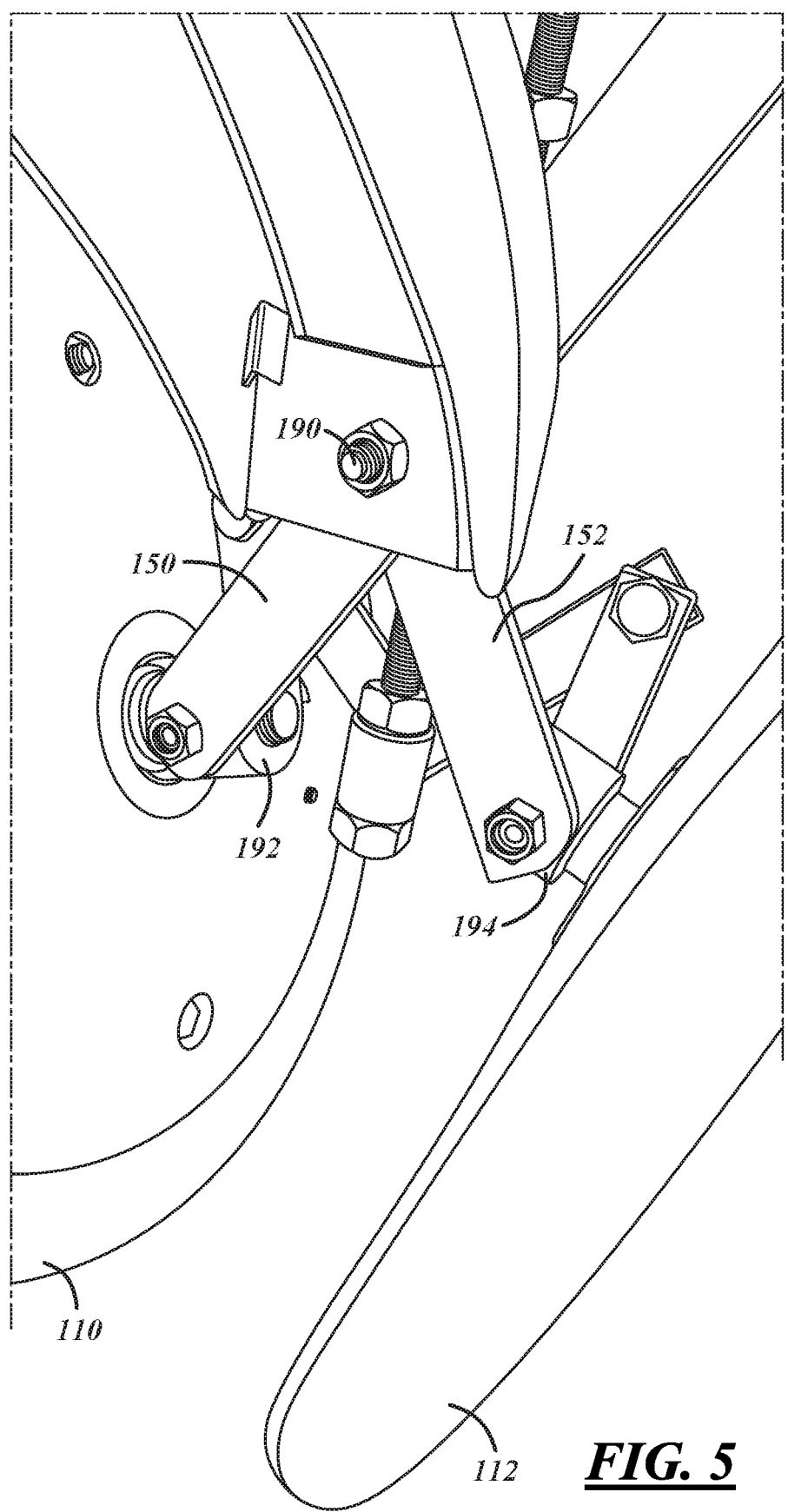
FIG. 5 depicts a close up view of the rear of adjustment mechanism of the closing wheel according to one or more embodiments shown and described herein.
Figure 6:
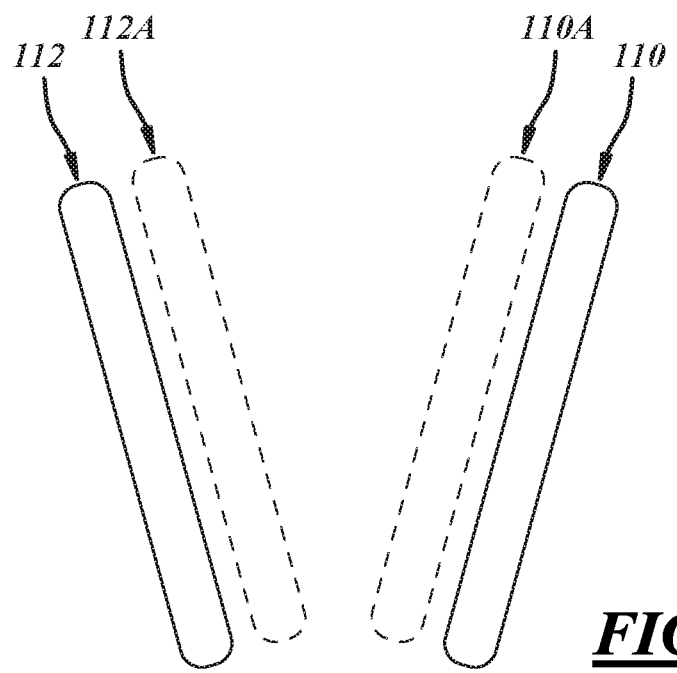
FIG. 6 depicts the wheels in a first position and a second position post lateral adjustment according to one or more embodiments shown and described herein.
Figure 7:
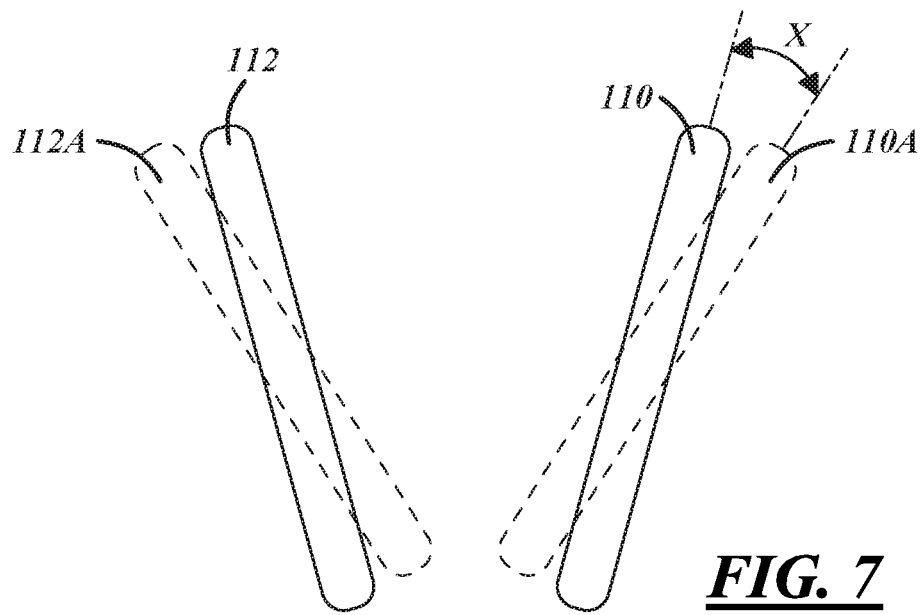
FIG. 7 depicts the wheels in a first position and a second position post pitch adjustment according to one or more embodiments shown and described herein.

FIGS. 3 and 4 depict the multi-link system to facilitate pitch adjustment of the closing wheel assembly. To facilitate pitch assembly, four links 160, 162, 164, 166 are interconnected and adjusted by a vertical adjuster 180. The vertical adjuster 180 may be turned by a drill or rotating means at the connection point 186. The vertical adjuster 180 connects to a connection point 182, which is directly connected to the cross bar 152. At the lower end of the vertical adjuster 180, a main pivot point 174 is provided whereby distal ends of the links 164, 166 are connected and rotatable about. The links 164, 166 further include opposite distal ends 170, 172 which include pivot points and connection points to connect the links 160, 162. The links 160, 162 further include connection points 176, 178 whereby the links are pivotally connected to the connection points 192, 194. The connection points 192, 194 connect directly to the central axis of rotation of each of the wheels 110, 112. This multi-link and multi pivot point configuration enables the vertical adjuster 180 to move the links 164, 166 at the end portion 184 and about the pivot point 174. This movement then facilitates rotation and movement of the links 160, 162 which are both connected to the wheels 110, 112. This movement creates an angular rotation of each of the wheels 110, 112 such as illustrated in FIG. 7. As illustrated in FIG. 7, the wheels 110, 112, are rotated to a varying pitch of angle X as illustrated by wheels 112A, 110A. In this embodiment, X is an angle of five degrees. However, this angular adjustment may be less than five degrees or up to 30 degrees in angular rotation thereby adjusting the pitch of each wheel 110, 112.

The materials used in the present invention are most commonly metals or metal alloys. However, other suitable plastics, polymers, polymer like materials . . . etc. may be used so long as they exhibit sufficient resiliency and strength to complete the function as discussed above.

The closing wheel of the present specification is particularly advantageous in that it accurately and successfully facilitates improved ground cover by pinching the soil over of newly planted seed. The variable angle and pitch of the wheels in combination provides for improves soil movement over the planted seed. Further, the adjustability of the wheels allows the user to accommodate various ground or soil conditions as needed.

It is noted that the terms "substantially" and "about" may be utilized herein to represent the inherent degree of uncertainty that may be attributed to any quantitative comparison, value, measurement, or other representation.

These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter.

Moreover, although various aspects of the claimed subject matter have been described herein, such aspects need not be utilized in combination.

It is therefore intended that the appended claims cover all such changes and modifications that are within the scope of the claimed subject matter.

What is claimed is:

1. A closing wheel assembly for use in connection with a planter during a planting process, the closing wheel assembly comprising:
    a frame connected to the planter;
    at least one set of closing wheels, the at least one set of closing wheels having a first wheel and an opposed second wheel; and
    an adjustment mechanism configured to adjust both lateral positioning and pitch of the first wheel and the second opposed wheel, the adjustment mechanism having a first adjustment portion configured to adjust lateral positioning, the first adjustment portion of the adjustment mechanism is adjusted by a horizontally positioned threaded bolt, the horizontally positioned threaded bolt is configured to pivot two cross support links, each of the cross support links having a intersecting pivot point, wherein each of the cross support links is connected to one of the first wheel or the second wheel so as to push or pull the first wheel and the second opposed wheel to facilitate lateral movement;
    the adjustment mechanism having a second adjustment portion configured to adjust pitch of the first wheel and the second opposed wheel, the second adjustment portion of the adjustment mechanism is adjusted by a vertically positioned threaded bolt, the second adjustment portion of the adjustment mechanism is adjusted by a plurality of interconnected links extending between the first wheel and the second opposed wheel, the plurality of interconnected links configured to facilitate rotational movement so as to adjust the pitch of the first wheel and the second wheel;
    wherein lateral positioning and pitch are adjusted to facilitate covering of a seed during the planting process.

2. The closing wheel assembly of claim 1 wherein two sets of closing wheels are provided.

3. The closing wheel assembly of claim 1 wherein the adjustment mechanism is configured to adjust the pitch of the at least one set of closing wheels between 5°-30° so as to facilitate ground covering during the planting process.

4. A closing wheel assembly for use in connection with a planter, the closing wheel assembly comprising:
    a frame connected to the planter;
    a first set of closing wheels and a second set of closing wheels, the first set of closing wheels and the second set of closing wheels each connected to the frame, the second set of closing wheels positioned behind the first set of closing wheels, the second set of closing wheels provided at a 5°-30° pitch to push soil back in place after planting; and
    a first adjustment mechanism configured to adjust both a lateral positioning and a pitch of the first set of closing wheels and a second adjustment mechanism configured to adjust both the lateral positioning and the pitch of the second set of closing wheels, the first adjustment mechanism having a first adjustment portion and the second adjustment mechanism having a second adjustment portion.

5. The closing wheel assembly of claim 4 wherein the first adjustment portion of the first adjustment mechanism is adjusted by a horizontally positioned threaded bolt.

6. The closing wheel assembly of claim 5 wherein the horizontally positioned threaded bolt is configured to pivot two cross support members, each of the cross support members having a central pivot point.

7. The closing wheel assembly of claim 6 wherein each of the cross support members is connected to one of a first wheel or a second wheel, each of the first set or second set of closing wheels, so as to push or pull the first wheel and the second wheel to facilitate lateral movement.

8. The closing wheel assembly of claim 4 wherein the second adjustment portion of the second adjustment mechanism is adjusted by a vertically positioned threaded bolt.

9. The closing wheel assembly of claim 8 wherein the second adjustment portion of the adjustment mechanism is adjusted by a plurality of links, the plurality of links configured to facilitate rotational movement so as to adjust the pitch of the first wheel and the second wheel.

* * * * *